(12) United States Patent
Metni et al.

(10) Patent No.: US 9,194,632 B2
(45) Date of Patent: Nov. 24, 2015

(54) WIND TUNNEL TURNING VANE HEAT EXCHANGER

(75) Inventors: N. Alan Metni, Austin, TX (US); Mark Arlitt, Austin, TX (US)

(73) Assignee: IFLY HOLDINGS, LLC, Austin, TX (US)

(*) Notice: Subject to any disclaimer, the term of this patent is extended or adjusted under 35 U.S.C. 154(b) by 494 days.

(21) Appl. No.: 13/520,616

(22) PCT Filed: Jan. 15, 2011

(86) PCT No.: PCT/US2011/021437
§ 371 (c)(1),
(2), (4) Date: Jul. 5, 2012

(87) PCT Pub. No.: WO2011/088426
PCT Pub. Date: Jul. 21, 2011

(65) Prior Publication Data
US 2012/0312502 A1 Dec. 13, 2012

Related U.S. Application Data

(60) Provisional application No. 61/295,229, filed on Jan. 15, 2010.

(51) Int. Cl.
*F16L 39/00* (2006.01)
*F28F 9/02* (2006.01)
(Continued)

(52) U.S. Cl.
CPC .............. *F28F 9/0248* (2013.01); *A63G 31/00* (2013.01); *B64D 23/00* (2013.01); *F28F 1/02* (2013.01);
(Continued)

(58) Field of Classification Search
USPC ......... 285/125.1, 132.1, 131.1, 129.1, 133.11
See application file for complete search history.

(56) References Cited

U.S. PATENT DOCUMENTS 884,326 A * 4/1908 Emery ....................... 123/41.28
2,788,020 A   4/1957 Davie, Jr.
(Continued)

FOREIGN PATENT DOCUMENTS

| CH | 609142 | 2/1979 |
|---|---|---|
| CN | 101639397 | 2/2010 |

(Continued)

OTHER PUBLICATIONS

International Search Report for International application No. PCT/US2011/021437 mailed Mar. 17, 2011.
(Continued)

*Primary Examiner* — Aaron Dunwoody
(74) *Attorney, Agent, or Firm* — Polson Intellectual Property Law, PC; Margaret Polson

(57) ABSTRACT

A cooling system for a wind tunnel (100) is disclosed. The heat exchanger (200) of the present disclosure is formed as a turning vane assembly in an airflow duct of a re-circulating wind tunnels. The individual vanes (201) are formed from extruded aluminum with coolant fluid channels (206, 207, 208) running continually down the length of the vane. One or more channels can be used, depending on the application of vane and the cooling capacity needed. The exterior of the vanes are formed in an airfoil shape to efficiently turn the air flow the de-sired amount in a manner well known in the art. The turning vanes are connected to a fluid supply (204) with single piece connectors (202) that removably attach to the turning vanes. In the depicted embodiment the connectors are attached with screws. In the depicted embodiment the connectors are formed as a single piece in a two-piece injection mold.

11 Claims, 5 Drawing Sheets

(51) Int. Cl.
*A63G 31/00* (2006.01)
*B64D 23/00* (2006.01)
*F28F 1/02* (2006.01)
*F28F 9/06* (2006.01)
*F28F 9/26* (2006.01)
*G01M 9/04* (2006.01)

(52) U.S. Cl.
CPC . *F28F 9/06* (2013.01); *F28F 9/266* (2013.01); *G01M 9/04* (2013.01); *A63G 31/007* (2013.01); *A63G 2031/005* (2013.01); *F28F 2250/02* (2013.01); *F28F 2275/20* (2013.01)

(56) References Cited

U.S. PATENT DOCUMENTS

| | | | |
|---|---|---|---|
| 2,914,941 | A | 12/1959 | Frenzl |
| 2,937,890 | A | 5/1960 | Mahoney |
| 3,369,792 | A | 2/1968 | Kraimer et al. |
| 4,082,325 | A * | 4/1978 | Laundy ............... 285/131.1 |
| 5,495,754 | A | 3/1996 | Starr, Jr. et al. |
| 5,660,418 | A * | 8/1997 | Crawford ............ 285/125.1 |
| 5,682,741 | A * | 11/1997 | Augustin et al. ............ 60/323 |
| 5,722,241 | A | 3/1998 | Huber |
| 5,734,202 | A | 3/1998 | Shuler |
| 6,083,110 | A | 7/2000 | Kitchen et al. |
| 6,290,266 | B1 * | 9/2001 | Kawano .............. 285/125.1 |
| 6,478,340 | B1 * | 11/2002 | Butler ................. 285/131.1 |
| 6,561,548 | B1 * | 5/2003 | Mantel et al. ............ 285/64 |
| 6,725,912 | B1 | 4/2004 | Moll et al. |
| 6,959,543 | B2 * | 11/2005 | Havemann et al. ....... 60/323 |
| RE43,028 | E | 12/2011 | Kitchen et al. |
| 8,413,435 | B2 * | 4/2013 | Sloss et al. ............. 60/323 |
| 2004/0115593 | A1 | 6/2004 | Hatlestad et al. |
| 2008/0277095 | A1 | 11/2008 | Zhai |
| 2009/0000286 | A1 * | 1/2009 | Aoki et al. .............. 60/323 |
| 2012/0068452 | A1 * | 3/2012 | Boettner ................. 285/45 |
| 2012/0263521 | A1 * | 10/2012 | Auer et al. .............. 403/218 |
| 2013/0049356 | A1 * | 2/2013 | Pittet et al. ............ 285/125.1 |
| 2013/0241196 | A1 * | 9/2013 | Armbruster et al. ..... 285/125.1 |
| 2015/0026993 | A1 * | 1/2015 | Sutter et al. ................. 34/96 |

FOREIGN PATENT DOCUMENTS

| | | |
|---|---|---|
| DE | 482902 | 9/1929 |
| DE | 1077410 | 3/1960 |
| DE | 2441990 | 3/1976 |
| DE | 20209893 | 10/2002 |
| EP | 1980705 | 10/2008 |
| JP | 63204129 | 8/1988 |
| JP | 3131289 | 6/1991 |
| JP | 11303527 | 11/1999 |
| WO | 2004026687 | 4/2004 |
| WO | 2006012647 | 2/2006 |
| WO | 2008136916 | 11/2008 |
| WO | 2011044860 | 4/2011 |

OTHER PUBLICATIONS

Written Opinion of the International Searching Authority for International application No. PCT/US2011/021437 mailed Mar. 17, 2011.
Written Opinion of the International Preliminary Examining Authority for International application No. PCT/US2011/021437 mailed Jan. 13, 2012.
Pope, Alan and Harper, John J.: "Low-Speed Wind Tunnel Testing" John Wiley & Sons, Inc., 1966, pp. 6-7 and 75-76.
Rossow, Vernon J.; Schmidt, Gene I.; Meyn, Larry A.; Ortner, Kimberley R.; and Holmes, Robert E.: "Aerodynamic Characteristics of an Air-Exchanger System for the 40-by 80-Foot Wind Tunnel at Ames Research Center", NASA TM 88192, Jan. 1986, pp. 4, 29 and 33.
Defrance, Smith J.: "The N.A.C.A. Full-Scale Wind Tunnel", National Advisory Committee for Aeronautics, Mar. 1933.
Wolf, T.: "Improvement and Modernization of Subsonic Wind Tunnels", Journal of Aircraft, vol. 30, No. 1, Jan.-Feb. 1993.
Gorlin, S.M. and Slezinger, I.I.: "Wind Tunnels and Their Instrumentation," p. 76-77, Clearinghouse, 1966.
Wenzinger, Carl J. and Harris, Thomas A.: "The Vertical Wind Tunnel of the National Advisory Committee for Aeronautics", National Advisory Committee for Aeronautics, Report No. 387, Feb. 1931.
First Office Action dated May 5, 2014 in related Chinese patent application 201180006247.9.
Examination Report No. 1 dated Sep. 13, 2013 in related Australian patent application No. 2011205659.
Applicant response dated Aug. 14, 2014 to Examination Report No. 1 dated Sep. 13, 2013 in related Australian patent application No. 2011205659.
Notice of Acceptance in related Australian patent application No. 2011205659.
Rae, William H, Jr. and Alan Pope, "Low-Speed Wind Tunnel Testing", 2nd edition. NY:John Wiley & Sons, 1984. p. 70.
Written Opinion in related Singapore application 102010500196X dated Aug. 14, 2015.

* cited by examiner

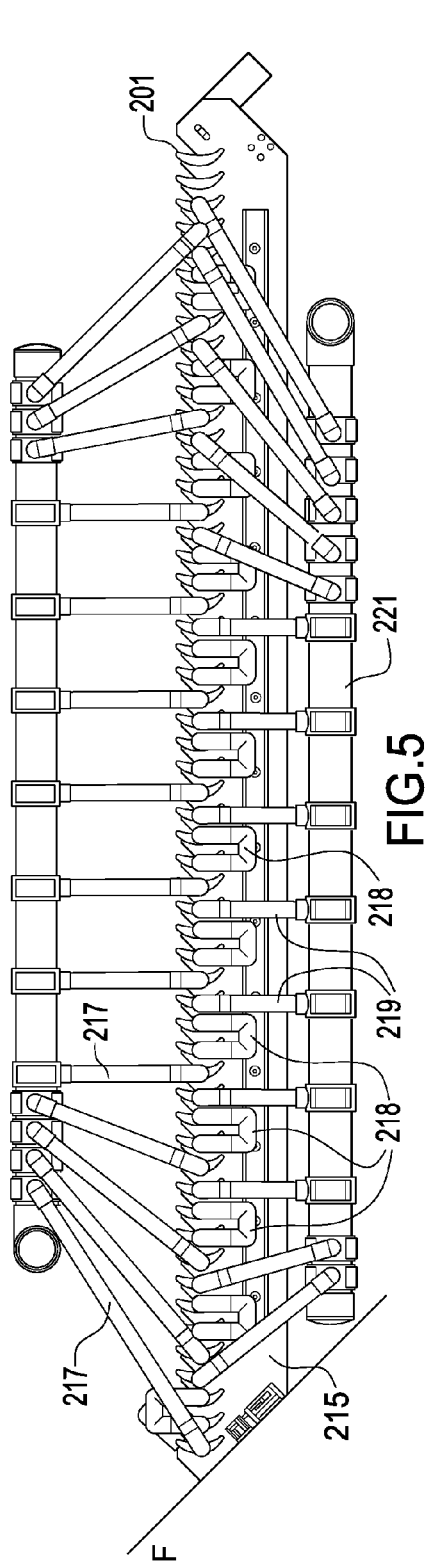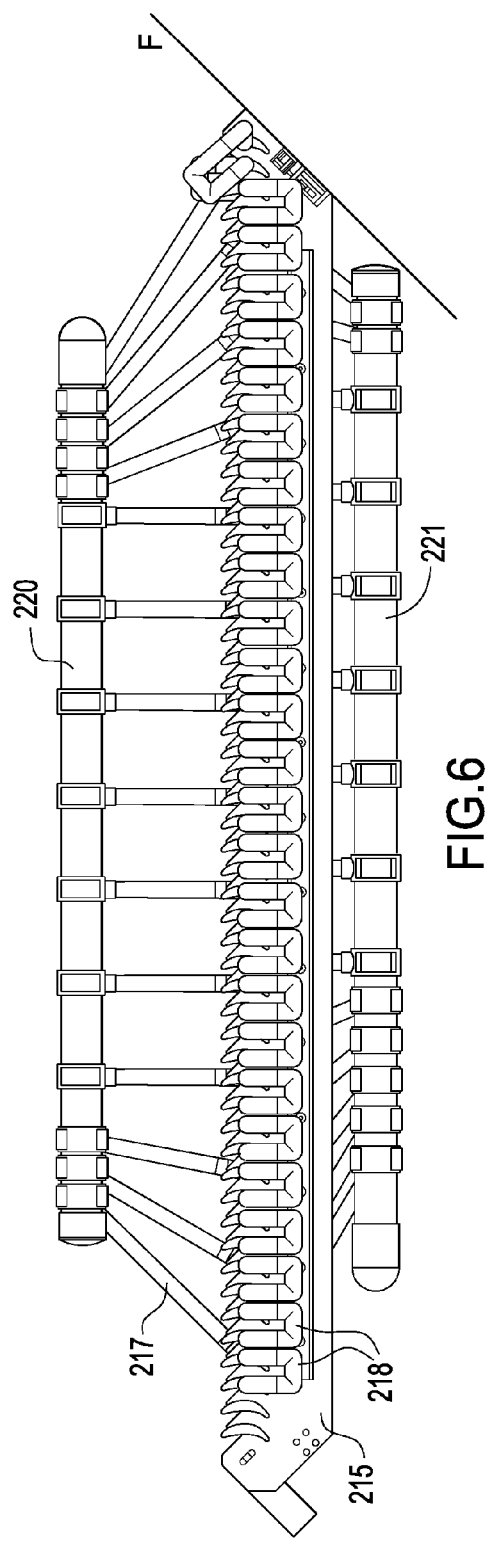

WIND TUNNEL TURNING VANE HEAT EXCHANGER

CROSS REFERENCE APPLICATIONS

This application is a non-provisional application claiming the benefit of provisional application No. 61/295,229; filed Jan. 15, 2010 which is hereby incorporated by reference for all purposes.

BACKGROUND

Wind tunnels have many uses, including research and as training devices and/or amusement rides that allow a person to simulate freefall skydiving. Wind tunnels have two broad types, open flow and re-circulating. Additionally wind tunnels can be oriented vertically or horizontally, that is with the airflow in the test section or flight section going generally parallel to the ground or generally vertically upward. Generally, only wind tunnels that are going to be used to simulate sky diving are built vertically, because building a vertical tunnel adds significantly to the expense. In any re-circulating tunnel, the direction of the air flow must be changed multiple times so that after one pass through the system the air ends up where it began. Turning vanes are often used for this purpose to change the direction of air flow while maintaining the laminar nature of the air flow thus decreasing the energy necessary to make the air turn.

Air flowing over the internal surfaces of the wind tunnel creates friction and thus heat. If the tunnel is open-flow, that heat is automatically ejected from the system into the atmosphere. In a closed circuit, re-circulating tunnel, virtually all of the energy put into the system becomes heat. Every kilowatt of electricity used by such a tunnel creates roughly 3414 British Thermal units of heat each hour. Some of these re-circulating wind tunnels use 2500 or more kilowatts of electricity and thus can generate more than 8 million btus of heat each hour. In a closed circuit tunnel, this heat quickly builds to a level that can be unbearable for the occupants. If a person is going to be in the air flow path, it is often necessary to remove this heat (cool the air) to ensure that person remains safe and comfortable. Cooling of the air sometimes needs to be done in research tunnels when the temperature of the air is part of the test conditions. Furthermore, if one can effectively capture and transport this heat to a location away from the wind tunnel where it may otherwise be needed, all or most of the energy used to operate the wind tunnel can be recycled or recaptured and then used to heat another structure or area. Thus, properly situated next to a facility that needs the heat (such as a shopping mall or water park), the majority of the cost to power the wind tunnel can be offset by the savings from heat recycling.

One method that has been used to cool the air in a re-circulating wind tunnel is to insert a cooling coil into the airflow and connect that coil to an external chiller. The heat transfers through the walls of the coil to a fluid or other medium inside the coil. The medium is then pumped to another location where the heat can be removed from the medium. Unfortunately, these prior art cooling coils added a large amount of drag to the wind tunnel (as much as doubling the total drag of the system) due to the additional friction caused by the passing the air over the surface of the coil. More power was also needed to overcome the additional drag induced by the coil in the airflow. Each additional kilowatt needed to overcome this cooling system drag then becomes more heat needing removal. Thus, this prior art method of inserting traditional cooling coils into the airflow is a very inefficient way to cool a re-circulating wind tunnel.

Another method used to cool wind tunnels was to embed cooling coils inside components that, for some other reason, already existed in the airflow. One example is to insert cooling coils into the turning vanes used to change the direction of the airflow at each corner—converting the vanes into a large heat exchanger. Since the vanes were already present in the system, no new drag was added and thus the problem of adding heat in order to take out heat was avoided. However, prior art turning vane heat exchangers were very expensive to build and/or maintain, adding significantly to the cost of building and maintaining the wind tunnel. They required a huge number of complex mechanical or welded connections between the various tubes or pipes of the cooling coil. Obtaining adequate heat transfer between the medium in the coils and the turning vanes was also very difficult with such a design. It is not clear that any turning vane heat exchangers capable of removing all of the heat generated by a wind tunnel were every successfully built.

The foregoing example of the related art and limitations related therewith are intended to be illustrative and not exclusive. Other limitations of the related art will become apparent to those of skill in the art upon a reading of the specification and a study of the drawings.

SUMMARY

One aspect of the present disclosure is a heat exchanger in which the heat transfer medium flows through a hollow turning vane in the wind tunnel.

One aspect of the present disclosure is a heat exchanger that has vanes extruded from aluminum with screw bosses formed into the interior of each vane and running continuously down its length to allow simple and inexpensive attachment of the vanes to end pieces.

One aspect of the present disclosure is a heat exchanger turning vane that connects to standard plumbing fittings.

One aspect of the present disclosure is a heat exchanger wherein the connection to the vane from a water pipe is a single transition piece that itself can be attached to the vane in a water tight manner without welding or chemical bonding, but rather with a simple mechanical connection.

One aspect of the present disclosure is a transition piece that can be attached to one end of the vane with screws or other fasteners solely from one side (the non vane side) of the transition piece.

One aspect of the present disclosure is a transition piece that can be attached to the heat transfer fluid inlet and heat transfer fluid outlet solely with inexpensive common plumbing components.

One aspect of the present disclosure is a heat exchanger wherein the transition piece is made from a single piece of molded material.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The heat exchanger of the present disclosure is formed as a turning vane in an airflow duct or high speed air channel, such as in a re-circulating wind tunnels. The individual vanes are formed from extruded aluminum with coolant fluid channels running continually down the length of the vane. One or more channels can be used, depending on the application of vane and the cooling capacity needed. The exterior of the vanes are formed in an airfoil shape to efficiently turn the air flow the desired amount in a manner well known in the art. The turning vanes are connected to a fluid supply with single piece connectors that removably attach to the turning vanes. In the depicted embodiment the connectors are attached with screws. In the depicted embodiment the connectors are formed as a single piece in a two-piece injection mold.

One embodiment is vane array comprising a plurality of hollow vanes, each having substantially constant cross section, the vanes disposed substantially parallel to each other; each vane having a first end and a second end; the array having a first edge defined by first ends of the plurality of vanes; the array having a second edge defined by second ends of the plurality of vanes; each vane's cross section defining at least two screw bosses formed therein; each vane having at its first end a first respective connection piece, first respective connection piece secured thereto by means of screws, each screw threadingly engaged with a respective screw boss; each vane having at its second end a second respective connection piece, first respective connection piece secured thereto by means of screws, each screw threadingly engaged with a respective screw boss; a first manifold disposed along the first edge; a second manifold disposed along one of the first edge and the second edge; and pipes connecting the first manifold, the connection pieces, and the second manifold, thereby defining a plurality of fluid flow paths, each fluid flow path passing from the first manifold and through at least one of the vanes to the second manifold.

The pipe connection to each connection piece defines an opening thereinto; the screw bosses formed into each vane's cross section including at least one screw boss positioned such that the screw threadingly engaged therewith has an axis passing through the opening.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 5 a perspective view of one section of one end of the heat exchanger turning vanes mounted in the frame with the fluid pluming attached.

FIG. 6 is a side elevation view of the other side of the heat exchanger turning vane.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
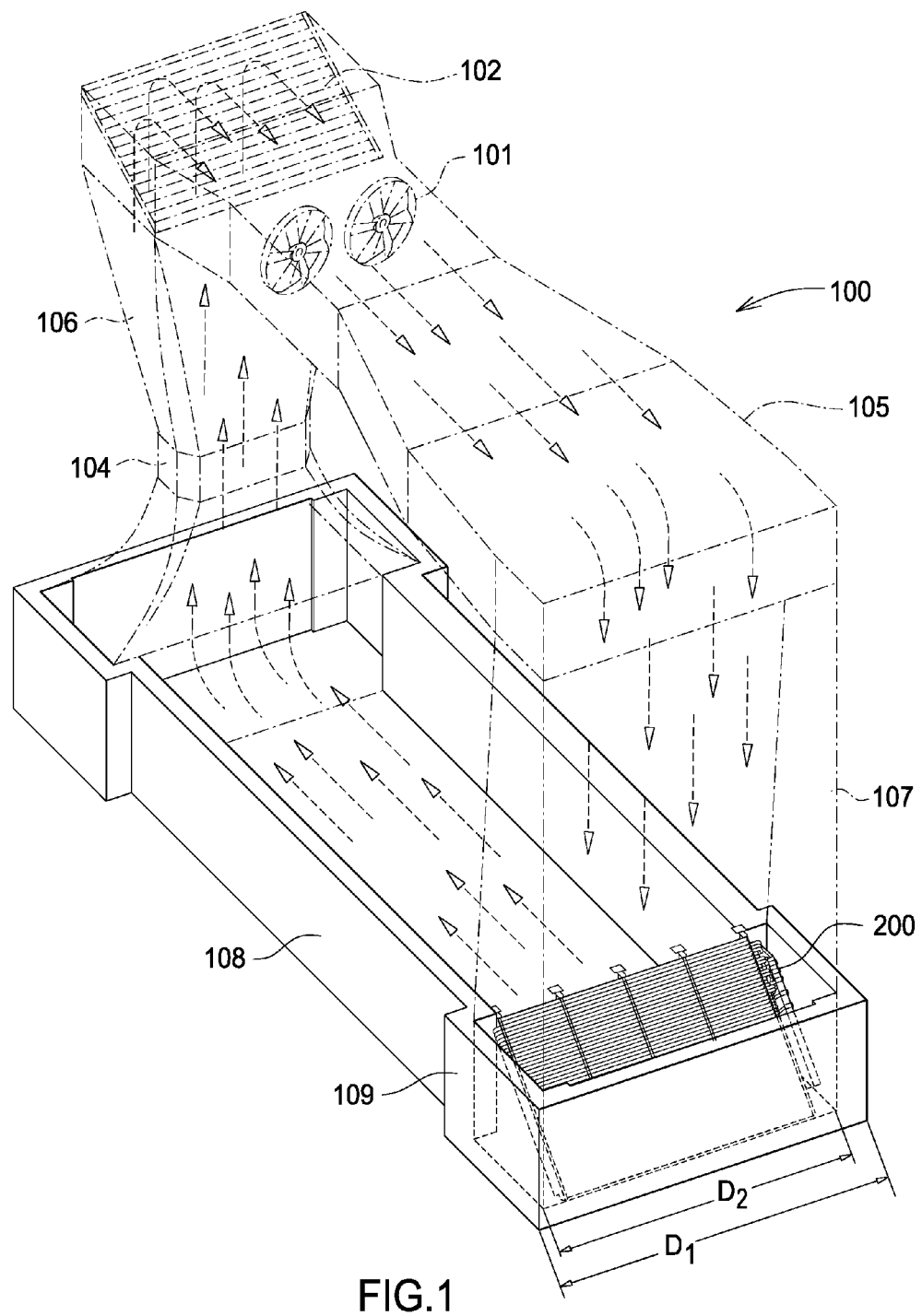
FIG. 1 is a perspective view of the heat exchanging turning vane in a re-circulating wind tunnel.

Referring first to FIG. 1, an upright re-circulating wind tunnel 100 is shown with the air flow shown in by the arrows A. This type of wind tunnel is most commonly used for skydiving simulation and other human flight activities. Other types of re-circulating wind tunnels are well known in the art, including ones used for various types of testing. Although the present disclosure will be discussed using the upright type, it is to be understood that the disclosure includes other types of re-circulating wind tunnels. A common feature of all re-circulating wind tunnels is the heat generated by the friction of the air flow through the plenums.

The re-circulating wind tunnel 100 can have a single return configuration, as shown in FIG. 1, or a multiple return configuration. See for example U.S. Pat. Nos. 6,083,110 and 7,156,744. A single return re-circulating wind tunnel 100 has a first upright plenum 106 which has flight chamber 104. The air A then flows into top plenum 105, second vertical plenum 107 and then into bottom plenum 108 and back into first upright plenum 106. The upright plenums 106, 107 and the top plenum 105 of the wind tunnel 100 are shown dotted lines for clarity. The position of the fans 101 is shown for purposes of example only and not by limitation. Fans 101 in other positions well known in the art could be used as well and are considered within the scope of this disclosure.

A heat exchanger turning vane assembly 200 is in end 109 of the bottom plenum 108. Other locations could be used as well depending on the particular application. More than one heat exchanger turning vane assembly 200 could also be used depending on the particular application. In many instances, a second heat exchanger turning vane assembly would be located below the flight chamber 104, due to the lower cost of installing the assembly on the ground. However, if needed in a particular installation, the assembly could be installed in the top plenum 105 corners.

Standard turning vane assemblies 102 can be used at the corners where no heat exchanger turning vane assembly 200 is installed to smoothly change the direction of the air flow with minimum turbulence. A turning vane assembly 102 is shown above the flight chamber 104 at the transition from the first vertical plenum to the top plenum 105 as an example. The other turning vanes have not been included to simplify the drawings, but may be used in normal operation of the re-circulating wind tunnel as a human flight simulator.

In the depicted embodiment, end 109 of the bottom air plenum 108 has a larger width D2 than the width of the bottom air plenum D1 to allow the plumbing of the heat exchanger turning vane 200 to be out of the main flow path to reduce air turbulence but this is not essential. Where the cooling system will be retrofitted into an existing wind tunnel, the plumbing at the end of the vanes can remain in the airflow.

Figure 2:
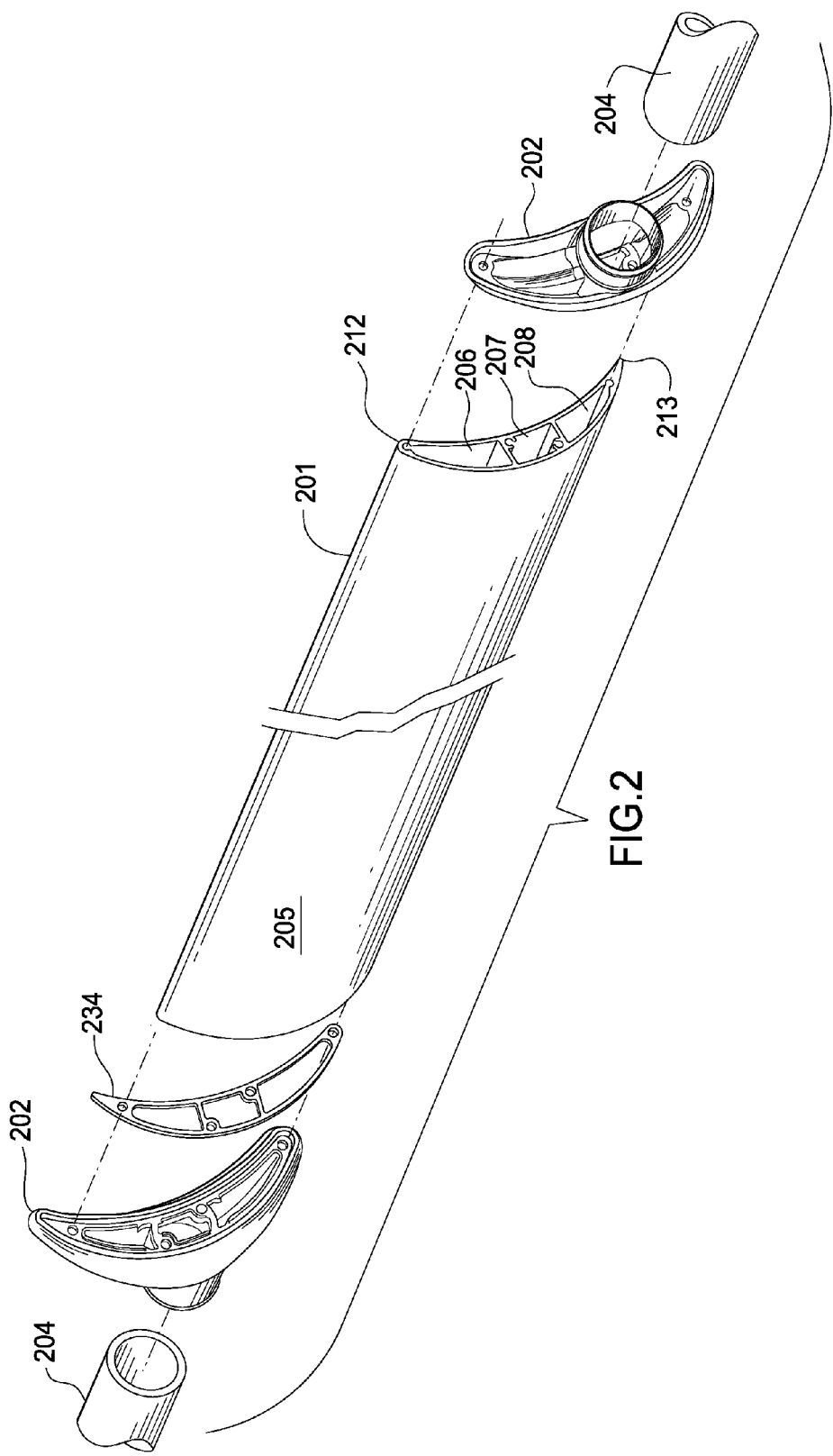
FIG. 2 is an exploded view of a single turning vane, the fluid pipes and the connection pieces.
Figure 3:
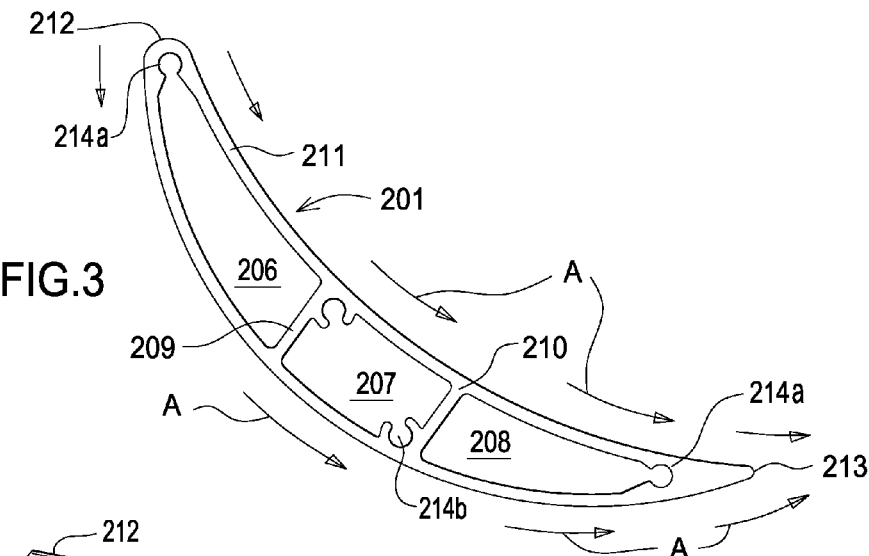
FIG. 3 is a side elevation view of one side of the heat exchanger turning vane.

FIG. 2 is an exploded view of a single heat exchanger turning vane 201 with two plumbing connection pieces 202, one at each end to connect to standard plumbing pipe with a common chemical bond or via a standard flexible hose 204 held in place with standard hose clamps. In the depicted embodiment, the hose 204 is made of rubber, but other flexible materials could be used as well. FIG. 3 is an end view of heat exchanger turning vane 201. The outer surface 205 is configured according to well known aerodynamic principles in a curved air foil shape to smoothly change the direction of the airflow. Arrows A indicate the airflow over the heat exchanger turning vane 201. In the depicted example, the airflow would change direction by 90 degrees. If desired, other amounts of change of direction could be achieved. The heat exchanger turning vane 201 has a substantially continuous interior configuration and substantially constant cross section in the depicted embodiment, such that the end view would also be a cross sectional view at any point along its length.

The heat exchanger turning vane 201 is made by extrusion molding of aluminum in the depicted example. Other materials with similar properties of good thermal exchange and sufficient rigidity could be used as well. The heat exchanger turning vane 201 is hollow to reduce the amount of material required and to allow for fluid to flow through the length of the heat exchanger turning vane 201 such that the fluid functions as a heat transfer medium. The thickness of the outer wall 211 is a balance between being thick enough to provide sufficient rigidity to the turning vane 201 and thin enough to allow good thermal exchange between the heat transfer medium flowing inside the vane and the air flowing over the outside of the vane. The air flowing over the surface 205 is thereby cooled as the heat is transferred into the fluid flowing inside the vane 201. In the depicted example, water is used as the cooling fluid due to its ready availability and lack of toxicity. This also allows the fluid heated by the heat exchange to be used to easily transport the heat to other locations or for other purposes for which water would normally be heated by standard heating devices. Examples include, but are not limited to domestic hot water use, swimming pools or aquariums and other uses as will be discussed further below. Other, known in the art heat transfer mediums could be used as well, including, but not limited to, Freon gas, salt water, compressed gasses and other refrigerants.

The length of the turning vane 201 can vary depending on the application. Vanes as long as 65 feet or longer can be used in large installations. Bracing members 209, 210 divide the interior space of the heat exchanger turning vane 201 into channels. The bracing members 209 and 210 are to ensure the heat exchanger turning vane 201 has sufficient rigidity to withstand the airflow and the weight of the fluid flowing through in use without bending. The bracing members 209, 210 also increase the surface area of the turning vane 201 that is in contact with the fluid, increasing the speed and efficiency of the heat transfer to the fluid. In the depicted embodiment there are three channels 206, 207 and 208. More or less channels and bracing members could be used depending on the size of the heat exchanger turning vane 201 and the volume of fluid flow desired. In the depicted embodiment, all of the fluid in a turning vane would be flowing in the same direction, regardless of how many channels the interior of the vane is divided into for structural reasons. The heat exchanging capacity depends on the surface area of the contact between the fluid and the turning vane 202, the thermal resistance of the material of the heat exchanger turning vane 201, the thermal resistance and flow rate of the fluid and the difference in temperature between the cooling fluid and the airflow. For any given turning vane 202 in any given installation, these factors will all need to be optimized to ensure sufficient cooling of the airflow occurs. In the depicted embodiment the majority of the area of the cross section of the turning vane 202 is fluid flow space, as seen in FIG. 3.

At ends 212 and 213 and at opposing corners of channel 207 screw bosses 214a, 214b are formed into the interior of the heat exchanger turning vane 201. These screw bosses 214a, 214b allow the turning vane 201 to be attached to a flange or other surface perpendicular to the direction of flow of the fluid in the vane. This method of attachment makes the assembly of turning vane assemblies 200 faster, easier and less expensive. Since the screw bosses can be formed into the extrusion mold for the turning vane 201, the turning vane 201 can be extruded to any length and then attached as needed with no further modification needed. Since the screw bosses 214a, 214b are formed inside the heat exchanger turning vane 201, the method of attachment to whatever transition piece or end plate does not disrupt the airflow over the turn vane, as in prior art methods of attaching turning vanes to support racks. If the attachment points were on the outer surface (airflow surface) of the turning vane 201 such extrusion molding could not be used, since then the attachment points would be on the entire surface of the turning vane 201, spoiling the aerodynamic qualities needed.

In an alternate embodiment the screw bosses 214a, 214b could be formed by leaving the area of the screw bosses solid in the extruded part and drilling out holes and possibly tapping threads after extrusion to form screw bosses 214a, 214b. In another alternate embodiment the screw attachments could be installed into the interior of or on the exterior of the turning vane after formation of the turning vane, such as by welding, epoxy or other means.

In a heat exchanger turning vane assembly 201 it is necessary that the attachment of the turning vane to the connection piece 202 be largely fluid tight, to allow for continuous flow of fluid, often under pressure. Depending on the application and the heat exchange medium being used, some low levels of leakage of exchange medium may be acceptable. Therefore the term fluid tight should be understood to encompass levels of fluid leakage at the junctions that are within operating tolerances. However, even once the screw bosses 214a, 214b are formed into interior of the turning vane 201, a connection piece that allows for a fluid tight connection that is easy to assemble and is not expensive to manufacture is needed. Large numbers of these connection pieces are needed, as will be discussed below. The greatest need for heat exchangers in re-circulating wind tunnels is in those used for amusement attractions and training facilities, which are often operated near continuously or at least for extended operating hours, unlike testing tunnels. When the wind tunnels are being used as amusement rides or training facilities, the cost and time to build the tunnel become a critical factor in the profitability of the business or viability of the project, while the need to keep the air at a comfortable temperature for paying customers and trainees increases, particularly in warmer climates. Further the heat exchanger must be easy to maintain in terms of both cost and down time, to prevent the maintenance costs of the wind tunnel from becoming excessive. Therefore the heat exchange mechanism as a whole must be low cost to build and must be able to be built, installed, inspected, tested, updated and/or replaced within reasonable time parameters. Further it is important that any needed repairs must be relatively easy and low cost to perform.

To lower costs it is desirable to be able to use as much off the shelf material as possible for the fluid connections both within the heat exchanger turning vane assembly 201 itself and to the fluid supply. Therefore it is desirable to be able to use standard plastic, rubber, PVC or similarly common plumbing pipes and/or hoses and connectors as much as possible. This allows for lower cost materials and easy to replace pieces when repairs are needed.

Therefore, the connection pieces 202 should function to form a simple, inexpensive, fluid tight connection between the airfoil shape of the turning vane 201 and standard plumbing pipe or hose 204 in the depicted embodiment. The connection pieces 202 must be easy to attach and remove from the turning vane 201 ends. The connection pieces 202 themselves should be low cost to manufacture, in the depicted embodiment they are manufactured from a two piece injection mold, which significantly reduces the cost of individual connection pieces 202 to manufacture.

The number and size of the turning vanes in a given heat exchanger turning vane assembly 200 needed in any particular heat exchanger application will depend on the airflow speed, heat to be exchanged, and airflow volume of a given tunnel.

Figure 4:
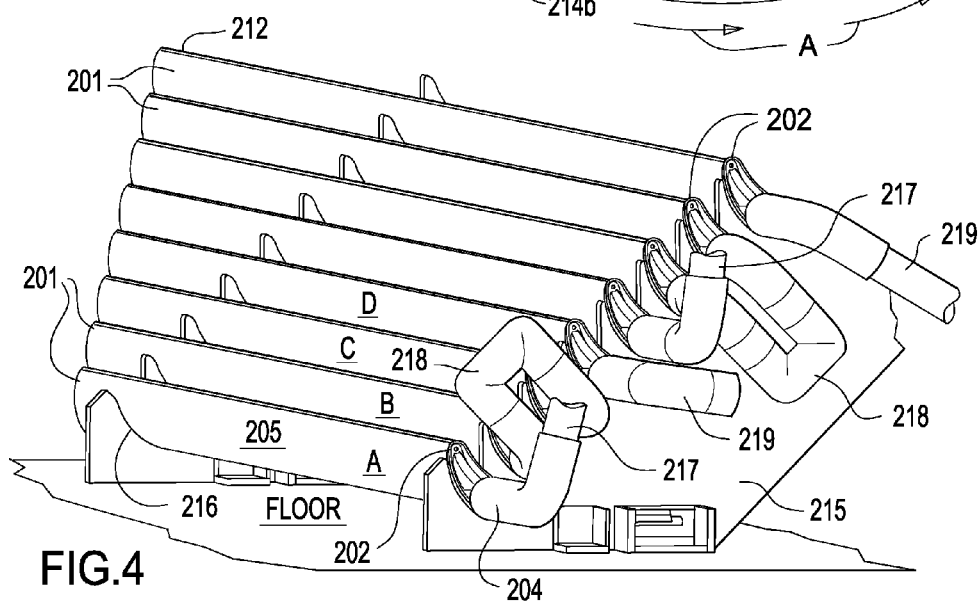
FIG. 4 is a perspective view of the bottom end of the heat exchanger turning vane assembly.

FIG. 4 is a perspective view of one end of the heat exchanger turning vane assembly 200 with the turning vane 201 mounted in a rack 215. In the depicted embodiment the rack 215 has shaped slots 216 to hold the turning vanes at the appropriate angle and orientation. The racks 215 are designed in such a manner that no additional mechanical connection is required to hold the smooth continuous exterior of the turning vane 201 to the rack 215. Side views of the whole heat exchanger turning vane assembly 200 can be seen in FIGS. 5 and 6. The horizontal floor of the bottom plenum 108 is indicated by line F. The racks 215 have been shown in a rotated manner for easy of viewing. This should not be taken to indicate that the racks 215 would be mounted in the orientation shown in the FIGS. 5 and 6. The appropriate orientation of the rack 215 and the heat exchanger turning vane assembly 200 is also shown in FIG. 1.

Referring again to FIG. 4, in the depicted embodiment the inflowing cold water flows through four turning vanes 201 before being carried away from the heat exchanger turning vane assembly 200 as warm water. The cold water flows in through inflow pipe 217 and is connected to pipe or rubber hose 204 which is connected to connection piece 202 and thence to the turning vane 201, labeled A in FIG. 4. The water flows through channels 206, 207 and 208 to the other end, which also has a connection piece attached to pipe or rubber hose 204 which in turn connects to U connection 218, seen in FIG. 6, which is like connected to the next turning vane 201, B, though another U connection 218 to another turning vane 201, C and then again through another U connection 218 to turning vane 201D and then out through outflow pipe 219. The labels A, B, C and D are purely to indicate the turning vanes 201 being discussed in the flow path to aid the reader in understanding the flow path of the depicted embodiment. These turning vanes 201 are not different from any of the other turning vanes 201 discussed herein. This configuration of flowing through four turning vanes is repeated with the remaining turning vanes 201. The inflow pipes 217 are connected to cold water supply pipe 220 and the outflow pipes are connected to warm water removal pipe 221.

The warm water can be used to heat any desired nearby location, either by flowing the warm water directly into a water supply line for pool or other location needing warm water, or by having a second heat exchanger on the other end of the line, allowing the heat to be pulled out the water at the desired location. For example, if the wind tunnel was near a shopping mall or other large recreation center the warm water could be flowed into a heating system for the building and the heat used to heat the building using standard warm water heat exchange systems. In those cases the now cooled water could be flowed back to the heat exchanger turning vane assembly 200 to the cold water supply pipe 220, forming a largely closed loop. There would need to be an inlet for more water into the system to replace water lost to small leaks etc. It may also be desirable to have a method to flush the system to remove any particle build up, such as mineral deposits, that could reduce the efficiency of the system This use of the energy in the heated water to heat some other system allows some of the energy cost of running the wind tunnel to be offset by reducing energy costs in another system. This reduces the overall energy consumption of the whole related complex as the complex is not paying for cooling the air in the wind tunnel and paying for heating some other system.

The flowing of the water through four turning vanes 201 in the depicted embodiment should not be taken as a limitation, fewer passes through turning vanes 201 or more passes though turning vanes 201 could be used, depending on the application and the cooling needs of any particular installation. As mentioned above, other cooling mediums could be used as well as water in a given installation. No limitation to a particular cooling medium is intended or should be implied.

The connection piece 202 is in FIGS. 7, 8, 9 and 10. Connection piece 202 has a body 235, a pipe connection piece 236 and a bottom surface 233. The body 235 has an outer ridge 228 which adds rigidity to the connection piece and gives it the proper aerodynamic shape. The rounded edges of the connection piece 202 are for structural and aesthetic reasons. The edges could be square or other configurations as desired. The pipe connection piece 236 has ring 237 extending annularly from its surface to allow standard hose clamps to attach a standard flexible hose to the adjacent connection pipe. If desired, a connection pipe could be attached directly to the pipe connection pieces 236 instead of having a flexible hose piece between them. The flexible hose piece allows for flex in the turning vanes 201 caused by the fluid flow or other forces to be absorbed without causing stress on the fluid pipes.

Figure 7:
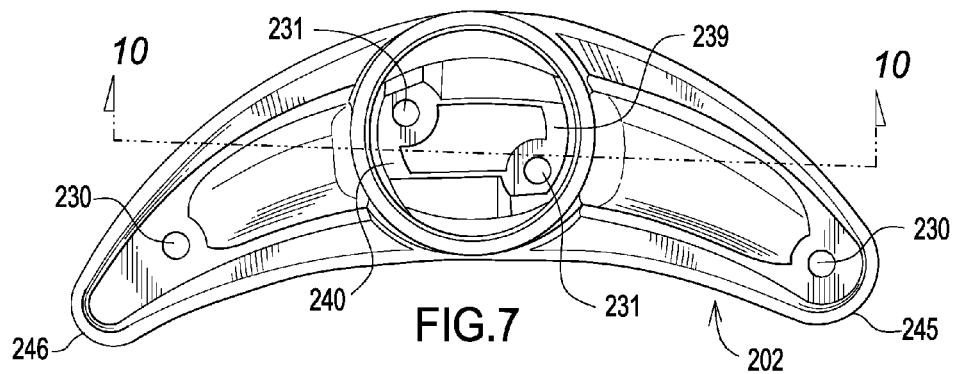
FIG. 7 is a top view plan of the connection piece.
Figure 8:
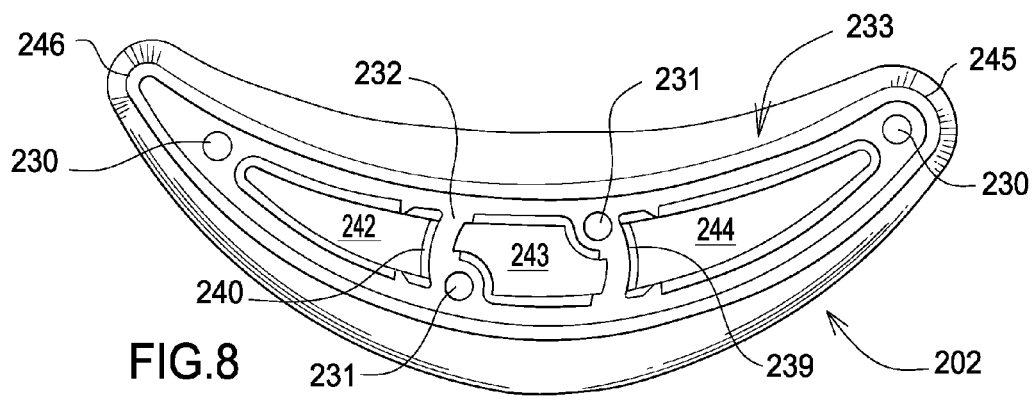
FIG. 8 is the bottom plan view of the connection piece.
Figure 9:
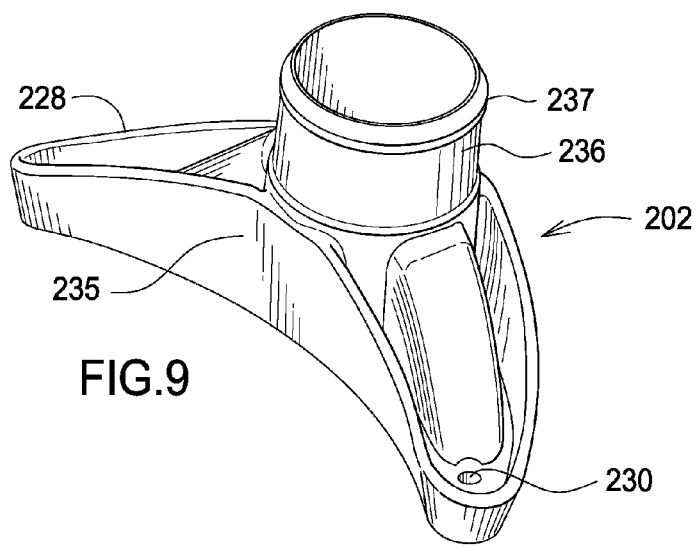
FIG. 9 is a top perspective view of the connection piece.
Figure 10:
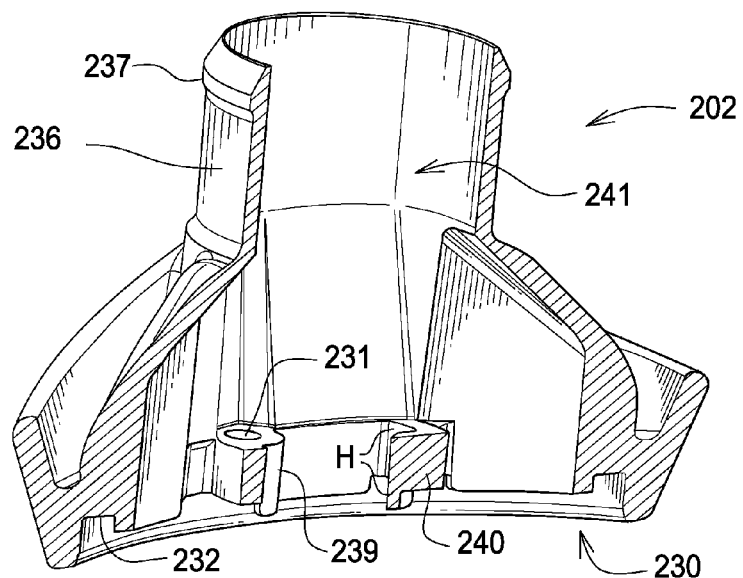
FIG. 10 is a cross sectional view taken along line 7-7 of the connection piece.

Referring to FIGS. 7 and 8, there are four screw holes 230, 231 that align with screw bosses 214a, 214b respectively on turning vane 201. Screw holes 230 are located near ends 245, 246 of the body 235 and align with screw bosses 214a. Screw holes 231 align with screw bosses 214b and are located on cross members 239, 240, which correspond in location and general shape to bracing members 209, 210. Cross members 239, 240 only extend a limited height H into the interior 241 as seen in FIG. 10. This leaves the majority of the interior 241 of the connection piece 202 open to allow for maximum fluid flow. The cross members 239, 240 need to be sufficiently rigid to hold the screws when the connection piece is held fluid tight against the turning vane 205. The exact height H of the cross members 239, 240 will depend on the specific application. The cross members 239, 240 divide the bottom surface 233 to form three openings 242, 243, 244 that correspond to channels 206, 207 and 208 in the turning vane 201. This allows the fluid to flow out of the interior of the turning vane and into the interior 241 of the connection piece 202 and then into the pipes and vice versa. The fluid flow from the pipes 217 into the connection piece is split into the channels 206, 207 and 208 through the connection piece 202. If a gaseous cooling medium is used, then gas tight connections will be needed, which can be provided with the appropriate sealing means.

All four screw holes 230, 231 are accessible from the top side of the connection piece 202, as can be seen in FIG. 7. This allows an installer or repair person to attach or remove the connection piece 202 easily and quickly with common tools. The screw holes 231 that attach to the screw bosses 214b on the connecting members 209 are required to ensure a water tight seal. Screw holes 231 are located within the flow area of the connection piece 201 so that any leak at the screw head would be inconsequential. This means that only the other two screw 230 locations require a gasket or o-ring to prevent or reduce leakage of the fluid from under the screw head. One gasket is used per screw location. Unless the turning vane is an extremely small one, the two internal screw connections are needed to ensure a fluid tight connection. In such a small turning vane, the bracing members 209, 210 might not be needed as well. Recess 232 is formed into the bottom surface 233 of connection piece 201 correspond to the shape of the end of turning vane 201, so that the connection piece 201 sets over the end of turning vane 201 to allow a water tight seal to be formed. A sealing gasket (not shown) fits in recess 232 and is shaped to correspond to the bottom of connection pieces 201. The sealing gasket is die-cut from a sheet of EPDM rubber in the depicted embodiment. Part of the shape of the recess 232 is designed to hold the sealing gasket in place while the connection piece is being attached to the turning vane. If a gaseous cooling medium is used, then gas tight connections will be needed, which can be provided with the appropriate sealing gaskets and sufficiently tighten screws. If needed the size of the screw holes can be different at each location.

The shape of the connection piece 202 in the depicted embodiment allows the connection piece to be formed in a two piece injection mold, allowing the connection pieces 202 to be manufactured at low cost. In the depicted embodiment the connection piece is made out of ABS Plastic but it may also be made from polycarbonate, polypropelene, polyvinyl chloride (PVC), nylon and other forms of plastic.

The above system allows a method of cooling comprising the following steps: flowing a working fluid at a first temperature through a pipe system to a first heat exchange unit;

the heat exchange unit formed of at least one turning vane having single unit connections pieces at each end of the hollow turning vane, the connection pieces being removably attached to the turning vane;

the connection pieces having been removably connected to the hollow turning vanes with mechanical connectors;

the heat exchange unit connected to the pipe system such that fluid can flow from the pipe system into the heat exchange unit;

passing the working fluid from the first heat exchange unit into a second heat exchange unit;

the method further comprising the steps, performed contemporaneously with the passing steps, of turning air as the air passes past the hollow turning vanes, and cooling the air as the air passes past the hollow turning vanes by transferring heat to the fluid and thereby raising the temperature of the water from the first temperature to a second temperature.

The method can further comprise using the heat removed in the first system to be transported to another system and used to heat another system. The method can further comprise returning the now cooled water to the first system.

While a number of exemplary aspects and embodiments have been discussed above, those of skill in the art will recognize certain modifications, permutations, additions and sub-combinations therefor. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure.

In general the terms and phrases used herein have their art-recognized meaning, which can be found by reference to standard texts, journal references and contexts known to those skilled in the art. The above definitions are provided to clarify their specific use in the context of the invention.

We claim:

1. A connection piece for connecting a fluid pipe and a hollow turning vane to allow a heat exchange medium to flow through the hollow turning vane in a heat exchanger turning vane for a re-circulating wind tunnel, the connection piece comprising:

a body having an upper and lower surface and a hollow interior;

a hollow pipe connection piece extending from the upper surface and connecting to the interior; the pipe connection piece connecting to a fluid pipe;

the lower surface being shaped to correspond to one end of the hollow turning vane;

the connection piece having a plurality of attachment points for attaching to the end of the hollow turning vane, the attachment points all being accessible from a top side;

the connection piece forming a fluid tight connection to the end of the hollow turning vane when the connection piece is removably attached to the hollow turning vane at only at the attachment points; and the connection piece being formed as a single unit.

2. The apparatus of claim 1 wherein the connection piece is formed in a two piece injection mold.

3. The apparatus of claim 1 wherein at least one of the attachment points is accessible through the hollow pipe connection and at least one attachment point is located on the upper surface of the body.

4. The apparatus of claim 3 wherein the least one point attachment accessible through the hollow pipe connection is located on a cross member located inside the interior of the body.

5. The apparatus of claim 1 further comprising at least one cross members, each of said at least one cross member having an attachment point.

6. The apparatus of claim 5 the attachment points are screw bosses and wherein the turning vane including the screw bosses is formed in an extrusion mold.

7. The apparatus of claim 1 further comprising a recess on the lower surface shaped to correspond to one end of the hollow turning vane.

8. The apparatus of claim 7 wherein a sealing gasket is placed inside the recess.

9. The apparatus of claim 5 wherein a height of the cross member is less than the height of the hollow interior such that a majority of the hollow interior is open.

10. The apparatus of claim 1 wherein at least one of the attachment points further comprises a sealing gasket.

11. The apparatus of claim 1 wherein the attachment points are threaded holes and screws are used to removably attach the connecting piece to the connection piece to the turning vane.

* * * * *